United States Patent
Nagashima (10) Patent No.: US 6,952,917 B2
(45) Date of Patent: Oct. 11, 2005

(54) DUAL LIQUID ENGINE AND ROCKET USING THE SAME

(75) Inventor: Ryuichi Nagashima, Tokyo (JP)

(73) Assignee: Japan Aerospace Exploration Agency, Ibaraki (JP)

( * ) Notice: Subject to any disclaimer, the term of this patent is extended or adjusted under 35 U.S.C. 154(b) by 0 days.

(21) Appl. No.: 10/610,635

(22) Filed: Jul. 2, 2003

(65) Prior Publication Data

US 2004/0118103 A1 Jun. 24, 2004

(30) Foreign Application Priority Data

Jul. 11, 2002 (JP) .................................. 2002-202911

(51) Int. Cl.⁷ ............................................. F02K 5/00
(52) U.S. Cl. ............................................ 60/246; 60/251
(58) Field of Search ........................ 60/246, 251, 643, 60/670, 267, 277

(56) References Cited

U.S. PATENT DOCUMENTS

| | | | | |
|---|---|---|---|---|
| 3,595,020 A | * | 7/1971 | Schubert et al. | 60/204 |
| 3,613,583 A | * | 10/1971 | Lai et al. | 102/336 |
| 3,771,313 A | * | 11/1973 | Kaiho | 60/216 |
| 4,640,794 A | * | 2/1987 | Tomita | 252/194 |
| 5,090,195 A | | 2/1992 | Boily | |
| 5,794,435 A | * | 8/1998 | Jones | 60/251 |
| 6,003,302 A | * | 12/1999 | Feldman | 60/767 |
| 6,293,091 B1 | * | 9/2001 | Seymour et al. | 60/225 |

FOREIGN PATENT DOCUMENTS

| | | |
|---|---|---|
| DE | 11 04 355 B | 4/1961 |
| RU | 2 186 237 C2 | 7/2002 |

OTHER PUBLICATIONS

E.V. Mukerjee et al., "Vaporizing liquid microthruster," *Sensors and Actuators A*, vol. 83, No. 1–3 (Elseviier Sequoia S.A., Lausanne, Switzerland, May 2000), pp. 231–236.

* cited by examiner

Primary Examiner—Hoang Nguyen
(74) Attorney, Agent, or Firm—Jacobson Holman PLLC (57) ABSTRACT

The engine for a rocket is suitable for using for an educational program. The engine uses a liquid phase propellant having a predetermined boiling point and a heating substance having a temperature higher than the boiling point. The engine has an inner wall having a circumferential surface; an outer wall surrounding the inner wall, the outer wall having an interior surface spaced from the circumferential surface of the inner wall by a predetermined distance such that the space between the circumferential surface and the interior surface form a mixing chamber having an opening; and injector for injecting the liquid-phase propellant and the heating substance into the mixing chamber so that the propellant is evaporated by the heating substance thereby creating a jet stream moving from the opening of the mixing chamber to the outside of the mixing chamber.

12 Claims, 9 Drawing Sheets

DUAL LIQUID ENGINE AND ROCKET USING THE SAME

BACKGROUND OF THE INVENTION

1. Field of the Invention

The present invention relates to a rocket, and more particularly to a rocket used for an educational program in educational organizations such as universities.

2. Description of Prior Art

For a few years, in educational organizations such as universities, educational programs have been carried out in order to provide an opportunity to study or research a rocket with students. Main stream of the rockets used for such educational programs are so-called "water rockets" using PET bottles or "model rockets" using small amount of explosives. However, most of these rockets are not more than toys, and the level of the rockets is not high enough to be suitable for a research in a university.

As a result, it is desired to have a rocket which is suitable for using in the educational program. However, it is not easy to obtain such rocket suitable for the educational program, since such rocket has to satisfy all of the following requirements.

Specifically, first of all, the rocket itself should be safe enough to be used. As long as the rocket flies, it would be impossible to eliminate all the danger caused thereby. Still, such danger should be kept within the level of the risk ordinarily encountered with in a laboratory of a university. Specifically, the rocket cannot employ mechanisms which discharge hazardous materials or those which involve combustion reaction, while it can employ mechanisms which have high-pressure, high-temperature or extremely low-temperature states of ordinary level.

Secondly, the rocket should not adversely affect on environment. For example, it is important to refrain from discharging chloride gas, which is inevitable for a solid rocket. This is also true from the viewpoint of safety.

Thirdly, the rocket should be extremely low cost. For the rocket is used in the educational program, the rocket needs to be so inexpensive that the cost for the rocket can be covered by the budget allocated to a laboratory of a university. From this viewpoint, the rocket cannot employ complicated mechanisms or costly propellants or materials.

Fourthly, the rocket should be worth studying as a research of university level. If the rocket is not more than a toy, such a rocket is not suitable for using in the educational program, even if it is safe and low cost. As a rocket used in the educational program, such rocket should employ, among others, techniques or engine functions which have never been tried by conventional aerospace organizations.

Fifthly, the rocket should have a possibility to be developed to a practical rocket. If the rocket has a possibility to be used in zero gravity experiments or as a rocket for launching a small satellite, the educational program will become active.

SUMMARY OF THE INVENTION

Accordingly, it is an object of the present invention to solve the problems just described. The present invention provides an engine for a rocket suitable for using for an educational program and a rocket using such an engine.

First of all, considering the above-described requirements, the present inventor concluded that nitrogen ($N_2$) and water ($H_2O$) should be employed as propellants which are necessary to obtain the thrust of the rocket for the following reasons. Specifically, first, materials having solid state are excluded since such materials cannot be used as a propellant without having combustion reaction. Then, conventional dual liquid propellants which have been researched are excluded from the viewpoints of safety and care to the environment, since they have inevitable combustion process. As a result, inert gases, nitrogen and water remain. Among these candidates, inert gases are excluded since any of them is rare and expensive. As a result, nitrogen and water remain as candidate for the propellants. Nitrogen is ordinarily and frequently used not only in its gaseous state but also in its extremely low-temperature state. It does not adversely affect on environment, and is cheap. Water is one of the safest materials, and its cost is close to zero.

Next, under the condition that either water or nitrogen will be used as a propellant, the present inventor concluded that liquid nitrogen ($LN_2$) should be heated, gasified and injected in order to obtain the thrust necessary to fly the rocket for the following reasons.

Specifically, first of all, the easiest way to obtain the thrust is to eject the water in its liquid phase, as seen in a water rocket using PET bottle. However, the specific thrust obtainable by this method is too low to use for an actual rocket. For instance, when tank pressure in the PET bottle is 4 atm (0.4 MPa), injection speed from a nozzle will be around 20 m/s (specific thrust: c.a. 2 seconds). As a result, even when the tank pressure is raised to 50 atm (5 MPa), the specific thrust is still around 7 seconds, which is very low.

Therefore, in order to increase the injection speed, it is necessary to gasify the propellant.

Next, while the propellant is in its gaseous phase when it is injected, it should be in its liquid phase when it is stored in a tank. This is because the volume of the propellant (here water or nitrogen) in its gaseous phase is larger than the volume in its liquid phase, and thus huge tank capacity will be required if the propellant has to be stored in its gaseous phase in the tank. This is not very difficult when water is used as the propellant, since water is in its liquid phase at ambient temperature. When nitrogen is used as the propellant, since nitrogen is in its gaseous phase at ambient temperature, it is necessary to fill it into the tank at very low temperature.

Furthermore, in order to heat the propellant to transform its liquid phase into its gaseous phase, and thus to improve the specific thrust, it is necessary to provide an energy source which heats the propellant. Here, the latent heat of vaporization and the specific heat of liquid nitrogen ($LN_2$) are one eleventh and one fourth of those of water ($H_2O$), respectively. Thus, considering that the propellant has to be heated to the temperature higher than its boiling point, it is apparent that $H_2O$ is superior propellant to $LN_2$ in this respect. More specifically, for example, the energy required for heating the propellant from its state at the time of lift off to the gaseous state having a temperature of 373 K (100 deg C.) is 510 [kJ/kg] for $N_2$, while it is 2,560 [kJ/kg] for $H_2O$, which is about five times of energy in comparison with the case of $N_2$.

For the above-described reasons, the present inventor concluded that nitrogen should be used as a propellant, and found out that the thrust required for flying the rocket can be obtained by heating the liquid-phase nitrogen stored in the tank in its extremely low-temperature state so that it is transformed to the gaseous phase, and injecting the gaseous nitrogen.

Finally, for the following reasons, the present inventor employed the mechanism where $LN_2$ is vaporized by using the heat capacity of $H_2O$. Specifically, in this mechanism, $H_2O$, which has high heat capacity, is heated to a liquid phase having high temperature and high pressure beforehand by using a heater, and this heated $H_2O$ as well as $LN_2$ are injected into a mixing chamber and mixed together therein.

First of all, the easiest way to heat $LN_2$ may be to use a thermal battery, which is used as a solid booster for H-IIA rocket, as a source for a heater. However, when this method is employed, it is necessary to use a thermal battery of 1.8 [kg (battery)/kg($LN_2$)] in order to simply evaporate $LN_2$, which has a latent heat of vaporization of 199 [kJ/kg]. Namely, almost twice as much of thermal battery as the propellant has to be used in this method. In addition, when this method using a battery is employed, the rocket has to carry a used battery just like a payload throughout its entire journey unless it employs a certain special mechanism to get rid of it. As a result, this method using a battery cannot be employed.

On the other hand, in view of safety, a heating method where $LN_2$ is heated by using a chemical reaction (such as the method employed in a solid rocket) cannot be employed either.

Thus, while $H_2O$ is excluded from using as a propellant because of its high heat capacity, the present inventor decided to use it as a heating source by taking advantage of this property. When $H_2O$ is used as a heating source, it is preferred to increase the heat capacity of $H_2O$ so that the amount of $H_2O$ required for heating $LN_2$ can be decreased.

One method for increasing the heat capacity of $H_2O$ may be using $H_2O$ in its gaseous phase by taking advantage of the high latent heat of vaporization of $H_2O$. However, since gaseous $H_2O$ has large volume, it is necessary to provide a huge tank for storing $H_2O$. In this regard, in order to reduce the volume of the gaseous $H_2O$, it is necessary to obtain $H_2O$ having a state of extremely high temperature and high pressure. From the viewpoint of the weight and safety of the tank for storing $H_2O$, the method where $H_2O$ is used in its gaseous phase is excluded, and thus a method where $H_2O$ is stored in its liquid phase should be employed.

Another method for increasing the heat capacity of $H_2O$ may be increasing the boiling point of $H_2O$ by increasing the saturated pressure of $H_2O$. For example, while the boiling point of $H_2O$ is 373 K (100 deg C.) at atmospheric pressure, it increases to 473 K (200 deg C.) at about 1.5 MPa. Namely, by increasing the pressure of $H_2O$ to the pressure usually used for a rocket tank employing a gas pressure conveyance, the boiling point of $H_2O$ can be increased by about 100 K. In addition, if the temperature of $H_2O$ is decreased below 273 K (0 deg C.) after it is mixed with $LN_2$, its latent heat of solidification (334 [kJ/kg]) can be utilized. In this connection, the high temperature/high pressure state of 473 K/1.5 MPa level is considered to be within the range allowable for a laboratory in a university.

Next, as for a method for exchanging heat between $H_2O$ and $LN_2$, a method where a heat exchanger is used and a method where both $H_2O$ and $LN_2$ are injected into a mixing chamber and mixed together may be employed. In the present invention, the latter is employed because the heat quantity of the water can be utilized up to the state close to the thermal equilibrium or below the freezing point of water.

Moreover, the method employed in the present invention does not need an ignition device, just like a liquid rocket using self-ignite propellant. Thus, this method is superior in its safety and reliability. In this regard, in this method, $H_2O$ used as a heat source is discharged outside the rocket as a mixture with gasified $LN_2$. As a result, this method leads to a system which is similar to the mechanism employed in an usual dual liquid-type liquid rocket.

Accordingly, the engine of the present invention uses a liquid phase propellant having a predetermined boiling point and a heating substance having a temperature higher than the boiling point, and the engine has an inner wall member having a circumferential surface; an outer wall member surrounding the inner wall member, the outer wall member having an interior surface spaced from the circumferential surface of the inner wall member by a predetermined distance such that the space between the circumferential surface and the interior surface form a mixing chamber having an opening; and injection means for injecting the liquid-phase propellant and the heating substance into the mixing chamber so that the propellant is evaporated by the heating substance thereby creating a jet stream moving from the opening of the mixing chamber to the outside thereof.

In one embodiment of the engine of the present invention, the inner wall member is shaped in the form of a cylinder having a top end and a bottom end, and the engine further has a nozzle part disposed at the bottom end of the inner wall member, the nozzle part having an outer diameter reducing in cross-section in a longitudinal direction away from the bottom end of the inner wall member.

In another embodiment of the engine of the present invention, the propellant and the heating substance are driven by a nitrogen gas and are fed to the injection means.

In yet another embodiment of the engine of the present invention, the propellant is liquid nitrogen.

In another embodiment of the engine of the present invention, the propellant is liquid hydrogen.

In yet another embodiment of the engine of the present invention, the heating substance is water.

In another embodiment of the engine of the present invention, the water has a heightened saturation pressure, and the injection means injects the water having a heightened saturation pressure into the mixing chamber.

In yet another embodiment of the engine of the present invention, the heating substance is hydrazine anhydride decomposed by a catalyst.

The present invention also directs to a rocket having any one of the above-described engines.

The present invention also directs to a rocket having: an inner wall member having a circumferential surface; an outer wall member surrounding the inner wall member, the outer wall member having an interior surface spaced from the circumferential surface of the inner wall member by a predetermined distance such that the space between the circumferential surface and the interior surface form a mixing chamber having an opening; a first tank holding a quantity of a liquid-phase propellant having a predetermined boiling point; a second tank holding a quantity of a heating substance having a temperature higher than the boiling point of the liquid-phase propellant, and injection means for injecting the liquid-phase propellant from the first tank and the heating substance from the second tank into the mixing chamber so that the propellant is evaporated by the heating substance thereby creating a jet stream moving from the opening of the mixing chamber to the outside thereof.

DESCRIPTION OF THE PREFERRED EMBODIMENT

With referring the drawings, embodiments of the present invention will be explained in detail hereinafter. In this connection, in the following explanation, "$LN_2$", "$GN_2$" and "$H_2O$" denote liquid nitrogen, nitrogen gas and water, respectively.

Figure 1:
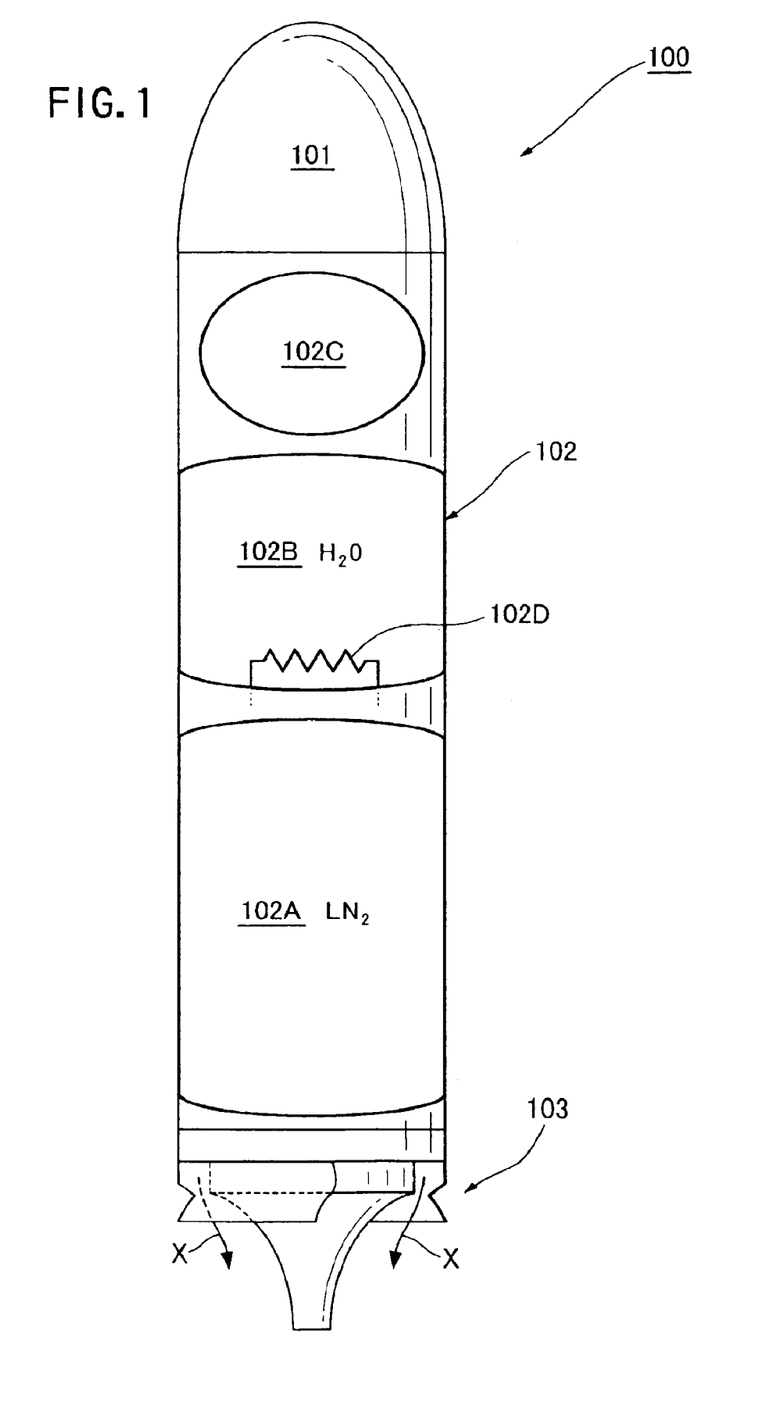
FIG. 1 is a mimetic diagram showing a schematic structure of the rocket to which the dual liquid engine of an embodiment of the present invention is mounted.

FIG. 1 is a mimetic diagram showing a schematic structure of the rocket to which the dual liquid engine of an embodiment of the present invention is mounted. Referring to FIG. 1, rocket 100 of the present invention has, for example, almost hollow cylindrical shape as a whole. The rocket includes payload part 101 to which predetermined equipments are mounted, tank part 102 for storing the propellants and driving gases, and plug nozzle part 103 for generating the thrust by using the propellants.

Tank part 102 has, among others, $LN_2$ tank 102A which is provided to the lower part of the tank 102 for storing $LN_2$ as a propellant, $H_2O$ tank 102B which is provided in the middle part of the tank 102 for storing $H_2O$ as a heating source for $LN_2$, gas accumulator 102C which is provided in the upper part of the tank 102 for storing $GN_2$ as a driving gas for extruding $LN_2$ stored in $LN_2$ tank 102A and $H_2O$ stored in $H_2O$ tank 102B into plug nozzle part 103, and heater 102D for heating $H_2O$ stored in $H_2O$ tank 102B to a high temperature.

The plug nozzle part 103 generates a thrust by using $LN_2$ stored in $LN_2$ tank 102A and $H_2O$ stored in $H_2O$ tank 102B.

In this connection, in FIG. 1, pipes for guiding $LN_2$, $H_2O$ or $GN_2$ and valves for controlling the stream of $LN_2$, $H_2O$ or $GN_2$ are not shown for simplifying this explanation. These pipes and valves are explained in detail later.

Figure 2:
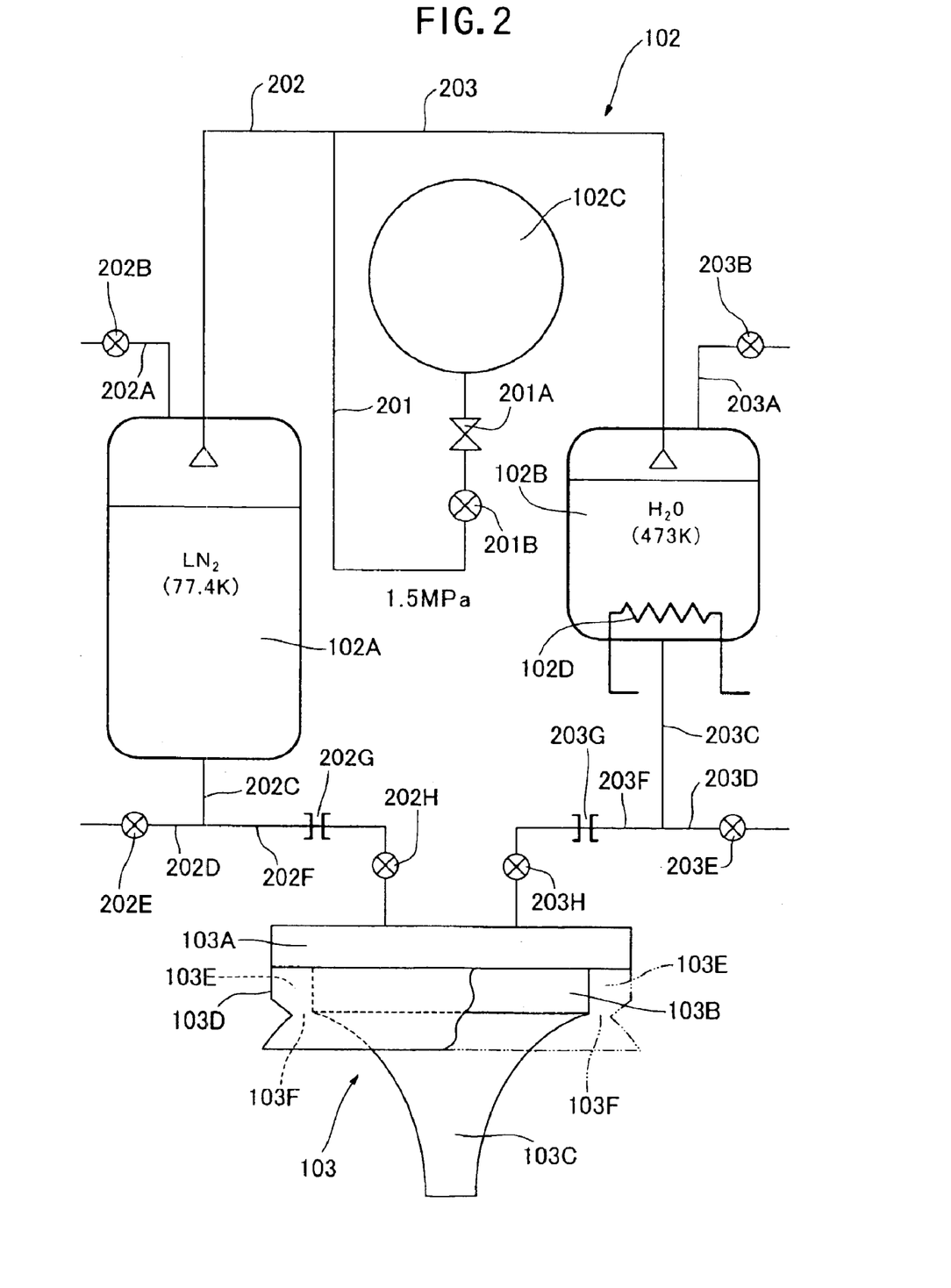
FIG. 2 is a mimetic diagram showing an example of a structure of the dual liquid engine of an embodiment of the present invention.

Next, referring to FIG. 2, specific structure of the dual liquid engine of the present invention will be explained. FIG. 2 is a mimetic diagram showing an example of a structure of the dual liquid engine of an embodiment of the present invention. In this connection, in FIG. 2, the same symbols as those used in FIG. 1 are used to represent the same structural elements.

Between gas accumulator 102C and $LN_2$ tank 102A, pipe 201 for leading $GN_2$ stored in gas accumulator 102C to $LN_2$ tank 102A ($H_2O$ tank 102B) and pipe 202 communicating with the pipe 201 are provided. To the pipe 201, regulating valve 201A for reducing the pressure of the high pressure $GN_2$ stored in gas accumulator 102C and shutoff valve 201B for allowing or disallowing the stream of $GN_2$ decompressed by regulating valve 201A are provided.

Above the $LN_2$ tank 102A, pipe 202A is provided such that it communicates with inside of the tank 102A. To the pipe 202A, safety valve 202B is provided so that it releases the pressure of the $LN_2$ tank 102A when the pressure of the tank 102A exceeds the allowable pressure.

Below the $LN_2$ tank 102A, pipe 202C is provided such that it communicates with inside of the tank 102A. The pipe 202C branches into pipe 202D and pipe 202F. To the pipe 202D, injection and ejection valve 202E is provided so that it injects $LN_2$ into $LN_2$ tank 102A and ejects $LN_2$ from $LN_2$ tank 102A are provided.

The pipe 202F is attached to the plug nozzle part 103 so that it leads $LN_2$ stored in $LN_2$ tank 102A to the plug nozzle part 103. To this pipe 202F, orifice 202G for controlling the flow rate of $LN_2$ and propellant valve 202H for allowing or disallowing the stream of $LN_2$.

On the other hand, between gas accumulator 102C and $H_2O$ tank 102B, pipe 201 for leading $GN_2$ stored in gas accumulator 102C to $H_2O$ tank 102B (and $LN_2$ tank 102A) and pipe 203 communicating with the pipe 201 are provided.

Above the $H_2O$ tank 102B, pipe 203A is provided such that it communicates with inside of the tank 102B. To the pipe 203A, safety valve 203B is provided so that it releases the pressure of the $H_2O$ tank 102B when the pressure of the tank 102B exceeds the allowable pressure.

Below the $H_2O$ tank 102B, pipe 203C is provided such that it communicates with inside of the tank 102B. The pipe 203C branches into pipe 203D and pipe 203F. To the pipe 203D, injection and ejection valve 203E is provided so that it injects $H_2O$ into $H_2O$ tank 102B and ejects $H_2O$ from $H_2O$ tank 102B.

The pipe 203F is attached to the plug nozzle part 103 so that it leads $H_2O$ stored in $H_2O$ tank 102B to the plug nozzle part 103. To this pipe 203F, orifice 203G for controlling the flow rate of $H_2O$ and propellant valve 203H for allowing or disallowing the stream of $H_2O$ are provided.

The plug nozzle part 103 has, among others, an injector 103A for injecting $LN_2$ led by the pipe 202F and $H_2O$ led by the pipe 203F, an inner wall member 103B constituting an inner wall of a mixing chamber 103E, which is the space to which $LN_2$ and $H_2O$ are injected by the injector 103A, an outer wall member 103D constituting an outer wall of the mixing chamber 103E, and a nozzle member 103C for accelerating the flow velocity of the gas discharged from an opening defined in the mixing chamber 103E, namely throat member 103F.

Specifically, the injector 103A has, for example, almost hollow cylindrical shape. The inner wall member 103B has almost cylindrical shape. The inner wall member 103B has an outer diameter which is smaller than the outer diameter of the injector 103A. The inner wall member 103B is provided to the bottom surface of the injector 103A such that it has coaxial relationship with the injector 103A.

The nozzle member 103C is provided to the bottom surface of the inner wall member 103B such that it has coaxial relationship with the inner wall member 103B. The nozzle member 103C has a shape such that its outer diameter reduces in cross-section in a longitudinal direction away from the bottom end of the inner wall member. The outer diameter reduces as such in order to achieve flow velocity higher than mach 1 of the gas discharged from the throat member 103F.

The outer wall member 103D is provided to the injector 103A such that it has coaxial relationship with the injector 103A. The outer wall member 103D together with inner wall member 103B forms a mixing chamber 103E. The outer diameter of outer wall member 103D is, for example, almost constant in a longitudinal direction away from the part of the outer wall member 103D at which the outer wall member 103D is attached to the injector 103A for a predetermined distance. The outer diameter decreases in a longitudinal direction toward the throat member 103F. The outer diameter increases in the following part. In this regard, the shape of the outer wall member 103D shown in FIG. 2 is mere example, and the shape of the outer wall member 103D can be altered. Specifically, when the pressure of the mixing chamber 103E is constant, since the thrust obtained get bigger as the area of the throat member 103F becomes larger, it is preferred that the outer wall member 103D has such shape that enables larger area of the throat member 103F.

Figure 3:
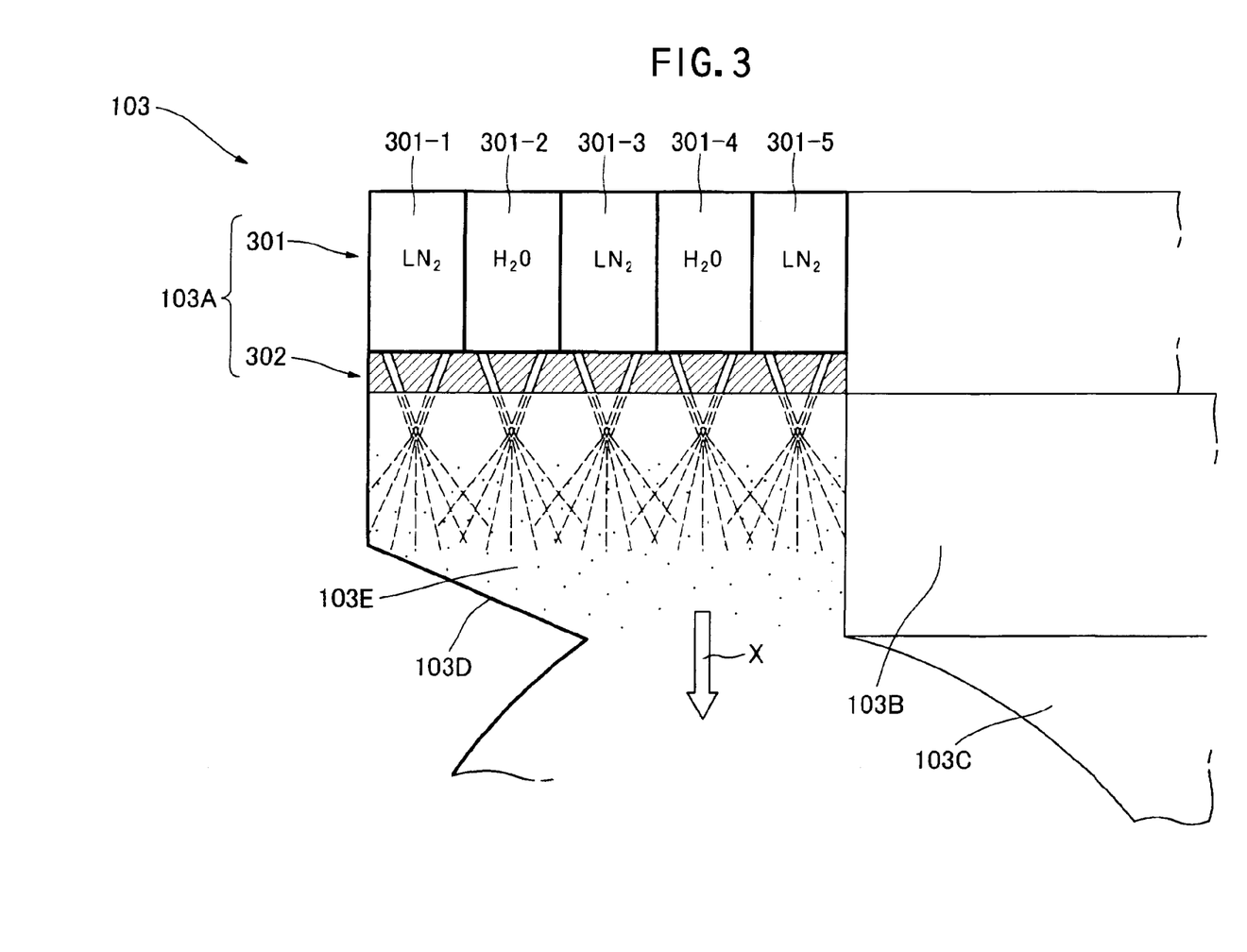
FIG. 3 is an enlarged cross-sectional view showing a portion of the plug nozzle part of the dual liquid engine of an embodiment of the present invention.

Referring to FIG. 3 as well as FIG. 2, the injector 103A in the plug nozzle part 103 will be explained in detail. FIG. 3 is an enlarged cross-sectional view showing a portion of the plug nozzle part of the dual liquid engine of an embodiment of the present invention. In this connection, in FIG. 3, the same symbols as those used in FIG. 2 are used to represent the same structural elements.

Referring to FIG. 3, in the injector 103A having a hollow cylindrical shape, storage part 301 for storing $LN_2$ and $H_2O$ and injection part 302 positioned at the bottom of the storage part 301 are defined at the portion of the injector 103A not opposing to the inner wall member 103B.

The storage part 301 contains plurality of $LN_2$ storage compartments having a predetermined capacity for storing $LN_2$ and $H_2O$ storage compartments having a predetermined capacity for storing $H_2O$. In this embodiment, in the direction from the outer wall member 103D to the inner wall member 103B, $LN_2$ storage compartment 301-1, $H_2O$ storage compartment 301-2, $LN_2$ storage compartment 301-3, 1120 storage compartment 301-4, and $LN_2$ storage compartment 301-5 are defined in this order. In this connection, there is no limitation for the number and the position of $LN_2$ storage compartments and $H_2O$ storage compartments.

The injection part 302 injects $LN_2$ and $H_2O$ stored in the storage part 301 to the mixing chamber 103E. Specifically, injection part 302 has two injection openings communicating to $LN_2$ storage compartment ($H_2O$ storage compartment) and to mixing chamber 103E, and these openings are defined at the portion opposing to the $LN_2$ storage compartment ($H_2O$ storage compartment). Through the injection openings, $LN_2$ ($H_2O$) stored in the $LN_2$ storage compartment ($H_2O$ storage compartment) is injected to the mixing chamber 103E. In addition, these two injection openings defined in each of the $LN_2$ storage compartments has a slope such that $LN_2$ injected through each of the injection openings collides one another and becomes fine in the mixing chamber 103E. Explanation has been made for the case where the injection part 302 makes the collision between $LN_2$ or between $H_2O$ such that $LN_2$ or $H_2O$ becomes fine in this embodiment, it is also possible to constitute that the injection part 302 makes the collision between $LN_2$ and $H_2O$ such that they become fine.

In this regard, it should be noted that the constitution of storage part 301 and injection part 302 shown in FIG. 3 is mere sample for one cross-section of the injector 103A having almost hollow cylindrical shape.

The dual liquid engine having the above-described structure of the embodiment of the present invention may not obtain larger specific thrust than usual rocket engine, because it does not have a combustion process. However, since it makes readily possible to achieve large thrust by increasing the area of the throat member, it is suitable for being used as a booster engine. A rocket having the dual liquid engine of the embodiment can prevent an explosion accident from occurring at the time of launching. Therefore, the rocket will be developed to a large booster rocket in the future.

Next, launching operation for the rocket having the dual liquid engine of the above-described structure will be explained. Here, as an example, explanation will be made for the case where the pressure of the mixing chamber 103E in the plug nozzle part 103C is 1 MPa.

First, explanation will be made for the procedure done prior to the launching. Referring to FIG. 2, at the initial state, the shutoff valve 201B, safety valve 203B, propellant valve 202H and propellant valve 203H are all closed, and the safety valve 202B is open. In the gas accumulator 102C, a driving gas, namely $GN_2$, having a high pressure (for example 20 MPa level) is stored. Here, $GN_2$ was used as a driving gas because it is inexpensive. However, other gas such as helium gas can be used instead of $GN_2$ as a driving gas. The $H_2O$ tank 102B is heated by the heater. As a result, the temperature and pressure (saturated pressure) of $H_2O$ stored in the tank are set to 473 K and 1.5 MPa, respectively. Thus, since the heat capacity of $H_2O$ stored in the $H_2O$ tank 102B is increased, the amount of $H_2O$ required for heating $LN_2$ can be reduced. When the pressure of the $H_2O$ tank 102B exceeds the predetermined allowable pressure, the safety valve 203B will be opened.

The temperature and pressure of $LN_2$ stored in the $LN_2$ tank 102A are set to 77.4 K and 0.1 MPa (1 atm, namely atmospheric pressure), respectively. Since the boiling point of $LN_2$ is 77.4 K under the state of 0. MPa, $LN_2$ stored in the $LN_2$ tank 102A will be boiled. Here, since the safety valve 202B is open, the boiled nitrogen gas is discharged outside the $LN_2$ tank 102A through the pipe 202A. As a result, since the liquid nitrogen carries the heat of vaporization away, incoming heat from outside to the $LN_2$ tank 102A can be cancelled. Therefore, $LN_2$ evaporates continuously, and thus the amount of $LN_2$ in the $LN_2$ tank 102A keeps decreasing, $LN_2$ is supplied to the $LN_2$ tank 102A by way of the injection and ejection valve 202E.

At the time of launching, first, the safety valve 202B (as well as the safety valve 203B if it is open) is closed. When the safety valve 202B is closed, as $LN_2$ boils, the pressure of $LN_2$ tank 102A becomes higher than its initial level of 0.1 MPa.

When the pressure of $LN_2$ tank 102A reaches to 1.5 MPa, the shutoff valve 201B will be opened. As a result, the high pressure $GN_2$ stored in the gas accumulator 102C is decompressed to 1.5 MPa by the regulating valve 201A, and then passes through the shutoff valve 201B. The $GN_2$ passed through the shutoff valve 201B is led by the pipe 201 to the pipe 202 and the pipe 203. In this regard, since the pressure is set for each of $LN_2$ tank 102A and $H_2O$ tank 102B to 1.5 MPa at the time of launching, only one regulating valve ("regulating valve 201A" in this embodiment) is necessary.

The $GN_2$ conveyed to the pipe 202 is supplied inside of the $LN_2$ tank 102A, and extrudes $LN_2$ stored in the $LN_2$ tank 102A to the direction toward the pipe 202C. The $LN_2$ extruded by $GN_2$ passes through the pipe 202C and pipe 202F, and reaches to the propellant valve 202H while the flow rate thereof is controlled by the orifice 202G. In this regard, since the specific gravity of $GN_2$ supplied inside of the LN$_2$ tank 102A is smaller than the specific gravity of LN$_2$ stored in the tank, GN$_2$ separates from LN$_2$ and sits on top of it in the tank. Therefore, it scarcely happens that they mix with each other.

The GN$_2$ conveyed to the pipe 203 is supplied to inside the H$_2$O tank 102B, and extrudes H$_2$O stored in the H$_2$O tank 102B to the direction toward the pipe 203G. The H$_2$O extruded by GN$_2$ passes through the pipe 203C and pipe 203F, and reaches to the propellant valve 203H while the flow rate thereof is controlled by the orifice 203G. This orifice 203G, as well as the above-described orifice 202G, functions to control the mixture ratio of LN$_2$ and H$_2$O conveyed to the plug nozzle part 103. In this regard, since the specific gravity of GN$_2$ supplied to inside the H$_2$O tank 102B is smaller than the specific gravity of H$_2$O stored in the tank, GN$_2$ separates from H$_2$O and sits on top of it in the tank. Therefore, it scarcely happens that they mix with each other.

After the LN$_2$ reaches to the propellant valve 202H, and after the H$_2$O reaches to the propellant valve 203H, these propellant valves are opened. As a result, the LN$_2$ and H$_2$O are conveyed to the injector 103A of the plug nozzle part 103.

Specifically, referring to FIG. 3, LN$_2$ is stored to LN$_2$ storage compartment in the storage part 301, and H$_2$O is stored to H$_2$O storage compartment in the storage part 301. For example, in FIG. 1, LN$_2$ is stored to LN$_2$ storage compartments 301-1, 301-3 and 301-5, and H$_2$O is stored to H$_2$O storage compartments 301-2 and 301-4.

The LN$_2$ (H$_2$O) stored in LN$_2$ storage compartment (H$_2$O storage compartment) passes through two injection openings defined such that they opposed to the LN$_2$ storage compartment (H$_2$O storage compartment) at the injection part 302, and is injected into the mixing chamber 103E. As described above, LN$_2$ (H$_2$O) passed through the injection openings collides one another and becomes fine. The fine LN$_2$ and the fine H$_2$O mix together, and LN$_2$ evaporates because of the heat capacity of H$_2$O. As a result, jet stream is created in the direction shown by the arrow X.

Thus, referring to FIG. 1, the rocket to which the dual liquid engine of the present embodiment can fly because of the thrust obtained by the generation of the jet stream in the direction shown by the arrow X.

Accordingly, in the present embodiment, a combination of a mixing chamber and a nozzle is employed instead of the combination of a combustion chamber and a nozzle employed in an ordinary engine. When such ordinary engine is used, the temperature of the combustion gas in the combustion chamber reaches up to about 2,500 deg C. to 3,000 deg C. Therefore, it is necessary to cool the combustion chamber and the nozzle in order to prevent the combustion chamber and the nozzle attached thereto from melting because of this high temperature. This is generally called "cooling problem." On the other hand, in the embodiment of the present invention, there is no combustion process of the propellant, and the temperature of the nitrogen gas heated in the mixing chamber is almost ambient temperature. Thus, there is no need to consider the cooling problem. In addition, in the above-described ordinary engine, because of various factors such as the cooling problem, it is impossible to employ a plug nozzle or Dual-Bell nozzle, which is a mechanism that enables to prevent the gas from bubbling and to improve the nozzle efficiency. On the other hand, in the present embodiment, since the cooling problem is eliminated, these mechanisms can readily be employed. Furthermore, in the present embodiment, since the problem of gas bubbling in the nozzle is solved, there is no need to raise the pressure of the mixing chamber, while it was necessary for the pressure of the conventional combustion chamber. In this connection, it is possible to raise the pressure of the mixing chamber in order to reduce the capacity of the engine.

Next, the specific thrust obtained by the dual liquid engine of the present embodiment will be explained. First of all, the prerequisites for considering the specific thrust will be explained.

In the dual liquid engine of the present embodiment accompanying with injection and mixing processes, the gas (GN$_2$) ejected from the nozzle contains fine particles (H$_2$O droplets or ice particles) therein. In the expansion process inside the plug nozzle part 103, these particles are accelerated by the gas, and the heat is emitted from the particles to the gas.

Generally, when the diameter of the particles is very small, the speed of the particles is almost the same as the speed of the gas. Thus, the particles and the gas are believed in the thermal equilibrium state. In this situation, the gas emits kinetic energy in order to accelerate the particles, and obtains thermal energy from the particles. When the diameter of the particles gets bigger, the mass of the particles is proportional to the cube of the diameter, while the resistance (Drag Force) of the particles against the gas is proportional to the square of the diameter. In this situation, the particles cannot move in the same speed as the gas, and cannot readily emit the heat to the gas. Therefore, the particles are ejected to outside the plug nozzle part 103 in higher temperature.

In order to make logical approach to the dual phase stream in the plug nozzle part 103, the following four assumptions are made: (1) The specific heats of the gas and the particles are constant throughout the nozzle stream. Since GN$_2$ and H$_2$O are stable, this assumption is reasonable; (2) The diameter of the particles is very small, the speed of the gas is the same as the speed of the particles, and the gas and the particles are in the state of thermal equilibrium. As was done for an ordinary engine, it is possible to create this situation in the present embodiment by colliding, fining and mixing the stream of LN$_2$ and the stream of H$_2$O by the injector (injector 103A) provided in the mixing chamber; (3) The energy necessary for accelerating the particles can be neglected since the volume occupied by the whole particles is small enough to be neglected in comparison with the volume of the gas. When the particle content β (particle fraction: the ratio of the mass of the particles to the total mass) is 0.25 (which corresponds to the temperature of the mixing chamber T$_c$ of 270 K), the percentage of the volume occupied by H$_2$O to GN$_2$ (1 [MPa]/270 K) is 0.5%; and (4) The nozzle stream is simple one-dimensional stream.

Under these assumptions, specific volume V, gas constant R and specific heat ratio κ as functions of the particle fraction β, and the equation of the perfect gas are represented as follows:

$$V=(1-\beta)V_g$$

$$R=(1-\beta)R_g$$

$$\kappa=\{(1-\beta)c_p+\beta c_s\}/\{(1-\beta)c_v+\beta c_s\}$$

$$P=R_gT/V_g=RT/V$$

By applying the above-described equations to the equation of the one-dimensional stream, the charts shown in FIGS. 4 to 9 are obtained as functions of the particle fraction β or of the temperature of the mixing chamber Tc.

Figure 4:
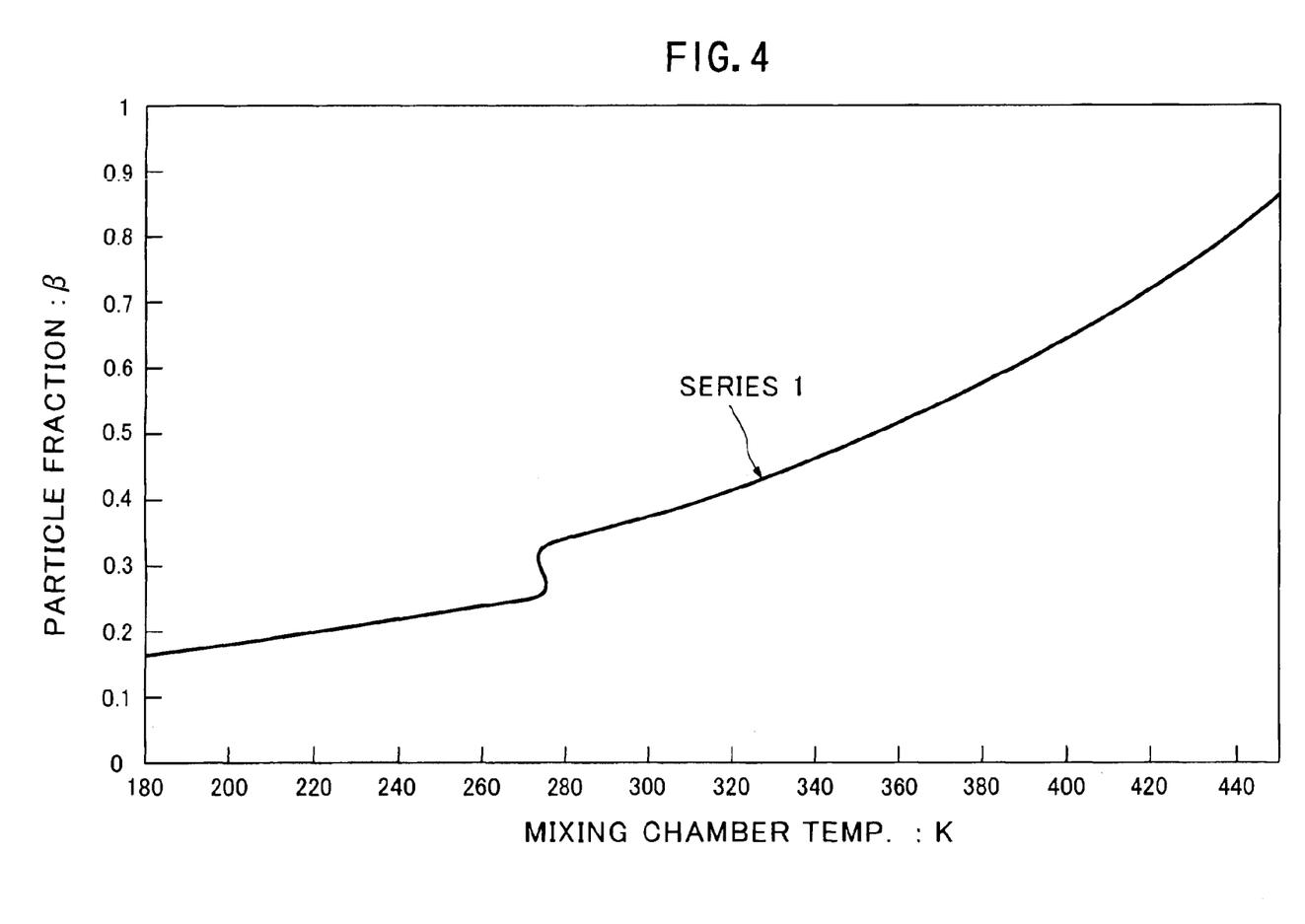
FIG. 4 is a chart showing the relationship between particle contents and mixing chamber temperature in the dual liquid engine of an embodiment of the present invention.
Figure 5:
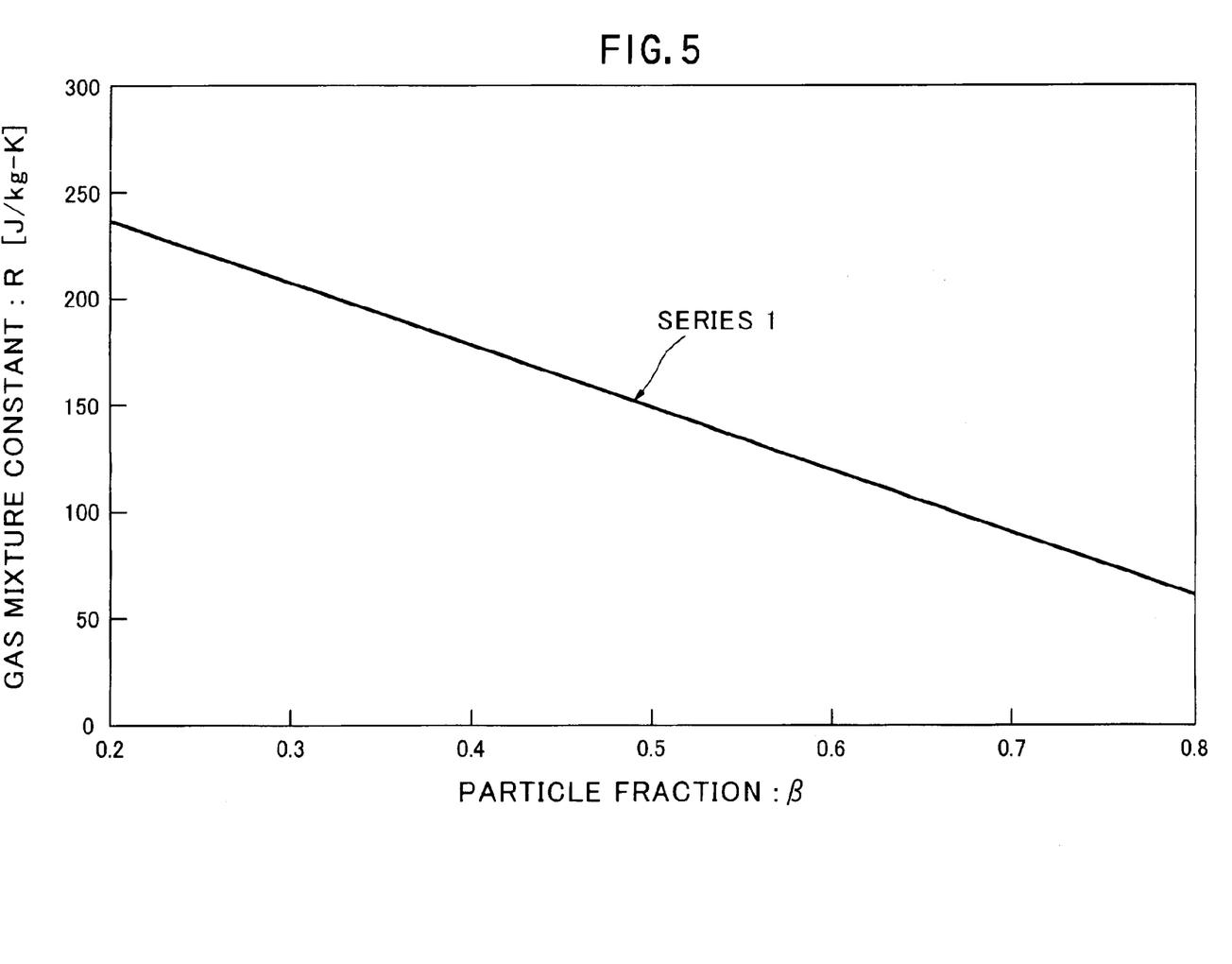
FIG. 5 is a chart showing the relationship between particle contents and gas mixture constant in the dual liquid engine of an embodiment of the present invention.
Figure 6:
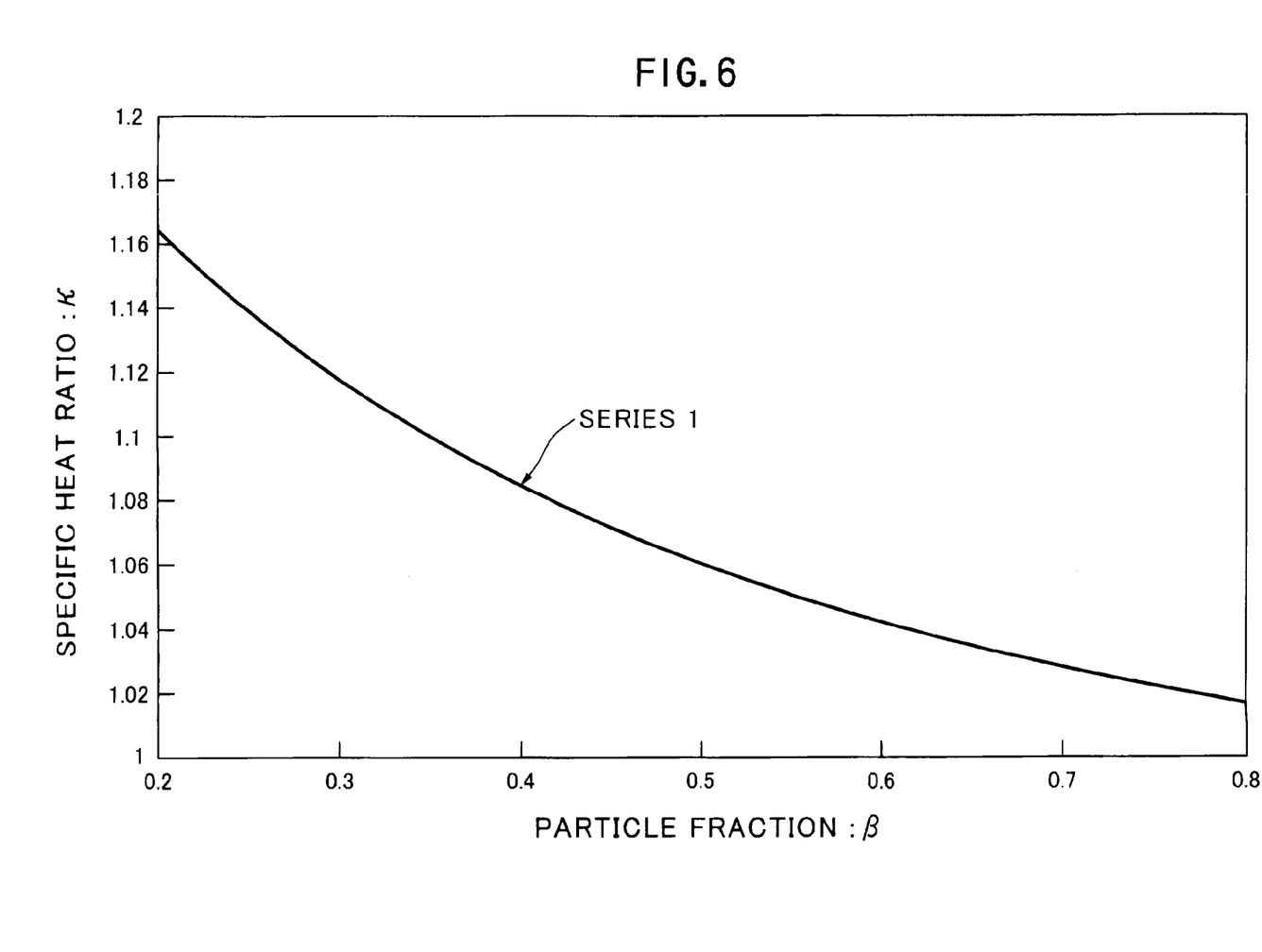
FIG. 6 is a chart showing the relationship between particle contents and specific heat ratio in the dual liquid engine of an embodiment of the present invention.
Figure 7:
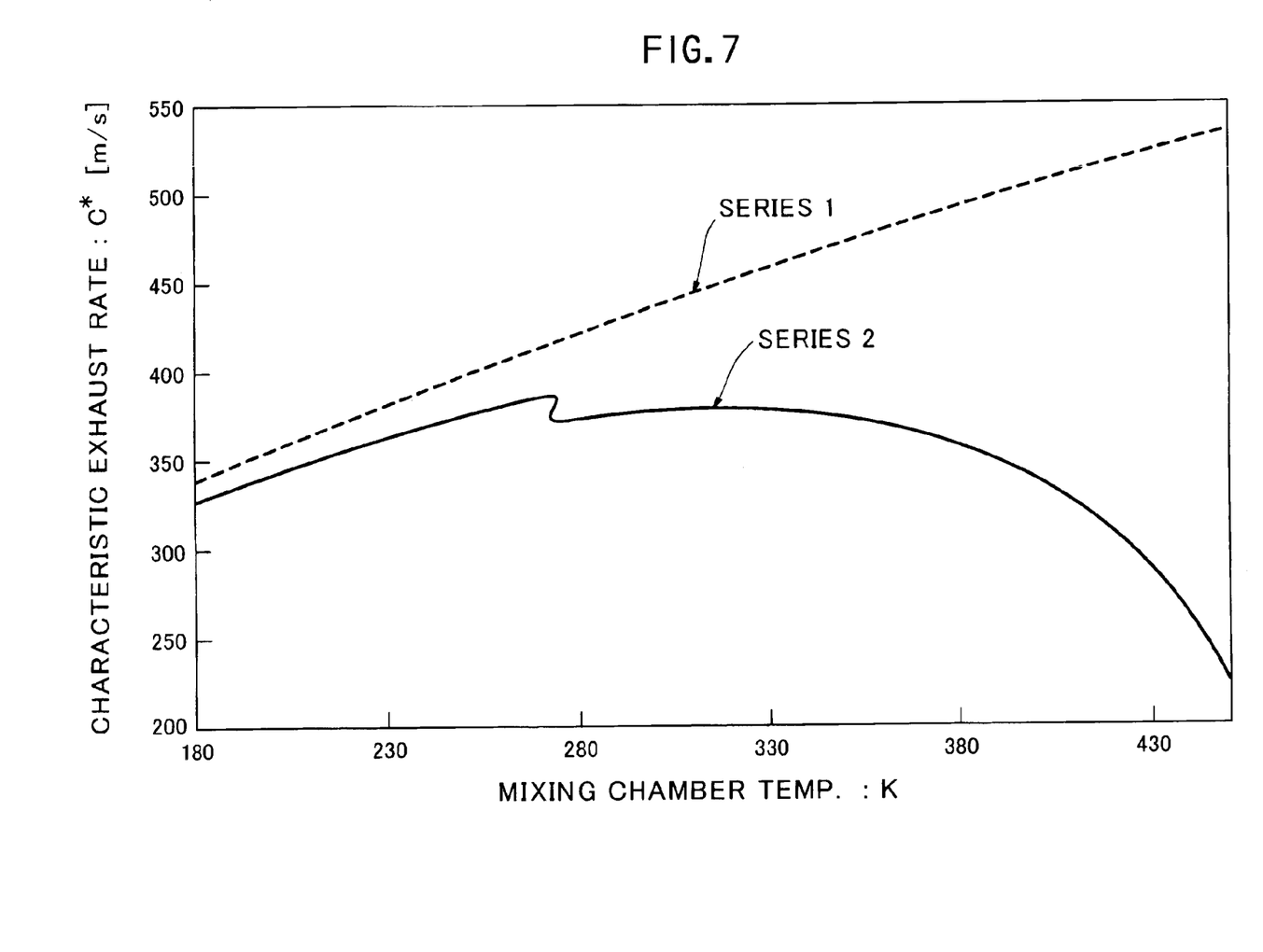
FIG. 7 is a chart showing the relationship between mixing chamber temperature and characteristic exhaust rate in the dual liquid engine of an embodiment of the present invention.
Figure 8:
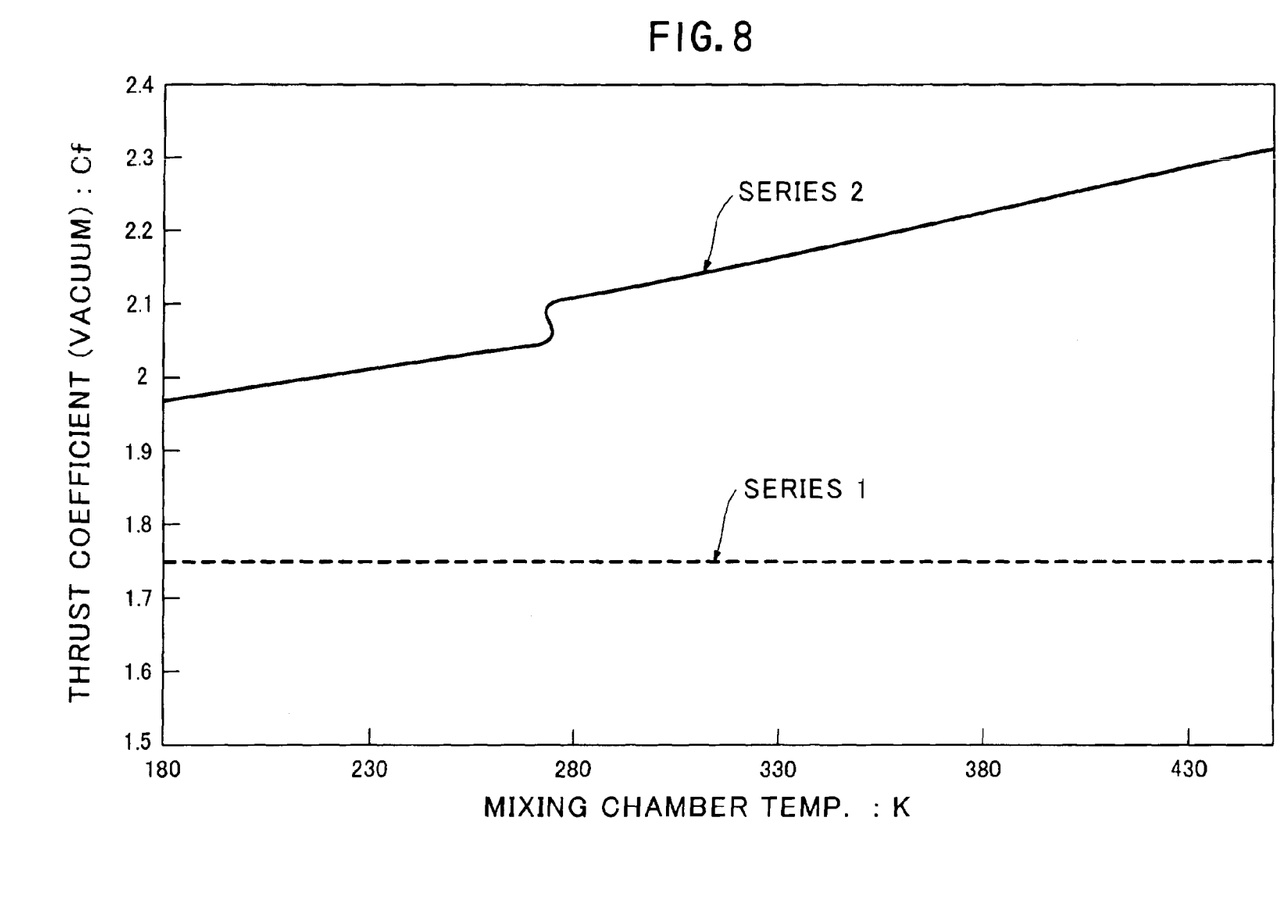
FIG. 8 is a chart showing the relationship between mixing chamber temperature and thrust coefficient in the dual liquid engine of an embodiment of the present invention.
Figure 9:
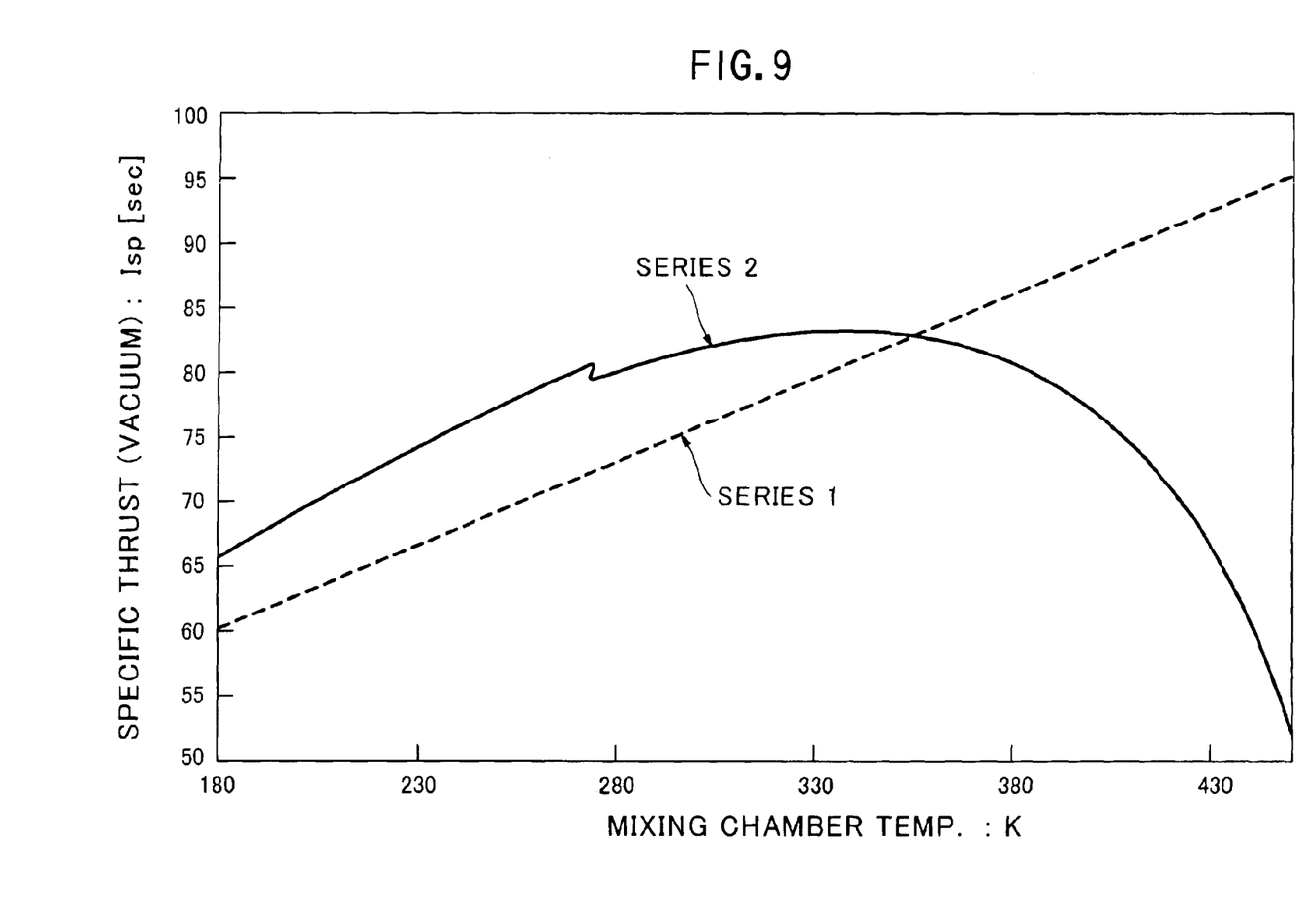
FIG. 9 is a chart showing the relationship between mixing chamber temperature and specific thrust (vacuum) in the dual liquid engine of an embodiment of the present invention.

FIG. 4 is a chart showing the relationship between particle contents and mixing chamber temperature in the dual liquid engine of an embodiment of the present invention. FIG. 5 is a chart showing the relationship between particle contents and gas mixture constant in the dual liquid engine of an embodiment of the present invention. FIG. 6 is a chart showing the relationship between particle contents and specific heat ratio in the dual liquid engine of an embodiment of the present invention. FIG. 7 is a chart showing the relationship between mixing chamber temperature and characteristic exhaust rate in the dual liquid engine of an embodiment of the present invention. FIG. 8 is a chart showing the relationship between mixing chamber temperature and thrust coefficient (the ratio of vacuum/nozzle expansion: 100) in the dual liquid engine of an embodiment of the present invention. FIG. 9 is a chart showing the relationship between mixing chamber temperature and specific thrust (vacuum) in the dual liquid engine of an embodiment of the present invention.

In this connection, it is assumed that the temperatures of $H_2O$ and $LN_2$ are 473 K (200 deg C.) and 77.4 K, respectively; that a plug nozzle is used; and that the nozzle area ratio is 100. Based in the chart thus obtained, the followings are concluded.

(1) Generally, the characteristic exhaust rate C* (specific thrust $I_{sp}$) is improved in proportion to the square root of the mixing chamber temperature (combustion temperature) Tc. On the other hand, in the present embodiment, as shown in FIG. 4, in order to increase Tc, it is necessary to increase the value of β, namely the amount of $H_2O$. In this regard, when Tc is decreased below 273 K (0 deg C.), it is possible to reduce the value of β since the latent heat of solidification of $H_2O$ (334 [kJ/kg]) is available.

(2) Generally, the characteristic exhaust rate C* is improved in inverse proportion to the square root of the gas constant R (inverse proportion to the square root of the molecular weight of the gas m). However, as shown in FIG. 5, in comparison with $GN_2$ (Rg: 346.4 [J/kg-K]), the value of R rapidly drops when the $H_2O$ content is increased.

(3) Generally, the thrust coefficient $C_F$ is improved as the specific heat ratio κ gets lower. However, as shown in FIG. 6, in comparison with $GN_2$ (K: 1.4), the value of κ rapidly drops when the value of β is decreased.

(4) As shown in FIG. 7, the characteristic exhaust rate C* is improved as Tc increases when there is only $GN_2$ (Series 1). However, in the present embodiment (Series 2), C* tends to decrease in mid course due to the increase of the value of β.

(5) On the other hand, as shown in FIG. 8, the thrust coefficient $C_F$ (vacuum) is constant as Tc changes when there is only $GN_2$ (Series 1). However, in the present embodiment (Series 2), $C_F$ tends to increase due to the decrease of the value of κ.

(6) Due to the tendency in the change of C* and $C_F$, the specific thrust (vacuum) $I_{sp}$ has a tendency shown in FIG. 9. Specifically, when there is only $GN_2$ (Series 1), $I_{sp}$ increases linearly as Tc increases. On the other hand, in the present embodiment (Series 2), it tends to decrease in mid course. The curve for Series I and the curve for Series 2 cross around Tc=340 K.

(7) The value of β suitable for the present embodiment is believed to be around 0.4 This value corresponds to Tc=320 K (see FIG. 4), which theoretically enables to obtain the maximum value of $I_{sp}$ about 83 [sec].

(8) Assuming that the specific thrust efficiency $\eta I_{sp}$ at the optimum value of β (0.4) is the same level (about 0.9) as an ordinary liquid rocket, the effective specific thrust (vacuum) of 75 [sec] (=83 [sec]×0.9) will be achieved according to the present embodiment. This value corresponds to about one fourth of the solid rocket (280 [sec] level). Therefore, the dual liquid rocket of the present embodiment can be suitably applied to the mission having low normalized ratio of $\Delta V/(I_{sp} \cdot g)$ in the future. For example, the dual liquid rocked will suitably be used as an "auxiliary booster (namely, the rocket which supports the first step rocket)", which is required to have large thrust rather than high specific thrust. In this regard, ΔV represents the increment of the rocket speed, and g represents the coefficient of gravity. On the other hand, when the dual liquid rocket of the present embodiment is used for the mission having high normalized ratio of $\Delta V/(I_{sp} \cdot g)$, improvement can be obtained by using "step rocket (namely, two-step rocket or three-step rocket)."

Incidentally, for the present embodiment, detailed explanation has been made regarding the situation where $LN_2$ and $H_2O$ are used as a propellant and heating substance injected into the mixing chamber, respectively. This is because consideration was given to the above-described safety and cost so that an engine and a rocket suitable for an educational program can be provided. However, at the application stage where such limitation for the safety and cost is not very severe, other types of propellant and heating substance can be used. Specifically, by injecting a liquid phase propellant having a predetermined boiling point and a heating substance having a temperature higher than the boiling point into a mixing chamber, the propellant is evaporated by the heating substance, and a jet stream moving from an opening of the mixing chamber (throat member) to the outside of the mixing chamber is created.

More specifically, as a propellant other than $LN_2$, it is preferred to use a substance having a small molecular weight, such as liquid hydrogen ($LH_2$), so that the performance of the engine can be improved. In this connection, the molecular weight of nitrogen gas and hydrogen gas is 28 and 2, respectively.

As a heating substance other than $H_2O$, for example, substances such as hydrazine anhydride ($NH_4$) can be used. When this hydrazine anhydride is decomposed by a catalyst, hydrogen gas and nitrogen gas having high temperature are generated. By using these gases as heating substances for evaporating a propellant, the performance of the engine will be improved significantly. In this regard, when hydrazine anhydride is used as a heating substance, it is necessary to inject the above-described high temperature gases generated by decomposing hydrazine anhydride with a catalyst into the mixing chamber. Alternatively, as a heating substance other than $H_2O$, simple and small "solid rocket" (a rocket which does not intend to fly but is a solid propellant used as an auxiliary driving gas generator) may also be used. This will improve the performance of the engine, since the temperature of nitrogen gas in the mixing chamber is significantly raised.

What is claimed is:

1. An engine using a nitrogen liquid phase propellant having a predetermined boiling point and a heating substance of water having a temperature higher than the boiling point, the engine comprising:

an inner wall member having a circumferential surface;

an outer wall member surrounding the inner wall member, the outer wall member having an interior surface spaced from the circumferential surface of the inner wall member by a predetermined distance such that the space between the circumferential surface and the interior surface form a mixing chamber having an opening; and injection means for injecting the nitrogen liquid-phase propellant and the heating substance of water into the mixing chamber so that the propellant is evaporated by the heating substance for creating a jet stream moving from the opening of the mixing chamber to the outside thereof without combustion.

2. The engine according to claim 1, wherein the inner wall member is shaped in the form of a cylinder having a top end and a bottom end, and the engine further comprises a nozzle part disposed at the bottom end of the inner wall member, the nozzle part having an outer diameter reducing in cross-section in a longitudinal direction away from the bottom end of the inner wall member.

3. The engine according to claim 1, wherein the propellant and the heating substance are driven by a nitrogen gas and are fed to the injection means.

4. The engine according to claim 1, wherein the water has a heightened saturation pressure, and the injection means injects the water having a heightened saturation pressure into the mixing chamber.

5. A rocket comprising the engine according to claim 1.

6. A rocket comprising:

an inner wall member having a circumferential surface;

an outer wall member surrounding the inner wall member, the outer wall member having an interior surface spaced from the circumferential surface of the inner wall member by a predetermined distance such that the space between the circumferential surface and the interior surface form a mixing chamber having an opening;

a first tank holding a quantity of a nitrogen liquid-phase propellant having a predetermined boiling point;

a second tank holding a quantity of a heating substance of water having a temperature higher than the boiling point of the liquid-phase propellant; and injection means for injecting the nitrogen liquid-phase propellant from the first tank and the heating substance of water from the second tank into the mixing chamber so that the propellant is evaporated by the heating substance for creating a jet stream moving from the opening of the mixing chamber to the outside thereof without combustion.

7. An engine using a nitrogen liquid phase propellant having a predetermined boiling point and a heating substance of water having a temperature higher than the boiling point, the engine comprising:

an inner wall member having a circumferential surface;

an outer wall member surrounding the inner wall member, the outer wall member having an interior surface spaced from the circumferential surface of the inner wall member by a predetermined distance such that the space between the circumferential surface and the interior surface form a mixing chamber having an opening; and injection means for injecting the nitrogen liquid-phase propellant and the heating substance of water into the mixing chamber so that the propellant is evaporated by the heating substance for creating a jet stream moving from the opening of the mixing chamber to the outside thereof solely by evaporation of the propellant.

8. The engine according to claim 7, wherein the inner wall member is shaped in the form of a cylinder having a top end and a bottom end, and the engine further comprises a nozzle part disposed at the bottom end of the inner wall member, the nozzle part having an outer diameter reducing in cross-section in a longitudinal direction away from the bottom end of the inner wall member.

9. The engine according to claim 7, wherein the propellant and the heating substance are driven by a nitrogen gas and are fed to the injection means.

10. The engine according to claim 7, wherein the water has a heightened saturation pressure, and the injection means injects the water having a heightened saturation pressure into the mixing chamber.

11. A rocket comprising the engine according to claim 7.

12. A rocket comprising:

an inner wall member having a circumferential surface;

an outer wall member surrounding the inner wall member, the outer wall member having an interior surface spaced from the circumferential surface of the inner wall member by a predetermined distance such that the space between the circumferential surface and the interior surface form a mixing chamber having an opening;

a first tank holding a quantity of a nitrogen liquid-phase propellant having a predetermined boiling point;

a second tank holding a quantity of a heating substance of water having a temperature higher than the boiling point of the nitrogen liquid-phase propellant; and injection means for injecting the nitrogen liquid-phase propellant and the heating substance of water into the mixing chamber so that the propellant is evaporated by the heating substance for creating a jet stream moving from the opening of the mixing chamber to the outside thereof solely by evaporation of the propellant.

* * * * *